(12) United States Patent
Fujikawa

(10) Patent No.: US 11,408,841 B2
(45) Date of Patent: Aug. 9, 2022

(54) THERMAL CONDUCTIVITY MEASURING DEVICE, HEATING DEVICE, THERMAL CONDUCTIVITY MEASURING METHOD, AND QUALITY ASSURANCE METHOD

(71) Applicant: SHOWA DENKO K.K., Tokyo (JP)

(72) Inventor: Yohei Fujikawa, Hikone (JP)

(73) Assignee: SHOWA DENKO K.K., Tokyo (JP)

( * ) Notice: Subject to any disclaimer, the term of this patent is extended or adjusted under 35 U.S.C. 154(b) by 341 days.

(21) Appl. No.: 16/559,746

(22) Filed: Sep. 4, 2019

(65) Prior Publication Data

US 2020/0080952 A1    Mar. 12, 2020

(30) Foreign Application Priority Data

Sep. 6, 2018    (JP) .............................. JP2018-167064

(51) Int. Cl.
| | |
|---|---|
| *G01N 25/18* | (2006.01) |
| *G01K 13/12* | (2006.01) |
| *G01J 5/12* | (2006.01) |
| *G01K 1/143* | (2021.01) |
| *G01K 7/08* | (2006.01) |

(52) U.S. Cl.
CPC .............. *G01N 25/18* (2013.01); *G01J 5/12* (2013.01); *G01K 1/143* (2013.01); *G01K 13/12* (2013.01); *G01K 7/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,406,539 B1 | * | 6/2002 | Shigeto | .................. C30B 23/00 |
| | | | | 117/88 |
| 2011/0111171 A1 | * | 5/2011 | Oyanagi | ................. C30B 29/36 |
| | | | | 428/131 |
| 2012/0212729 A1 | * | 8/2012 | Hart | ................... B01D 17/0217 |
| | | | | 356/51 |

FOREIGN PATENT DOCUMENTS

| | | | | |
|---|---|---|---|---|
| CN | 101308107 A | | 11/2008 | |
| CN | 101470088 A | | 7/2009 | |
| CN | 201666887 U | | 12/2010 | |
| CN | 101308107 B | * | 10/2011 | ............. G01N 25/20 |
| CN | 103149233 A | | 6/2013 | |
| CN | 103175865 A | | 6/2013 | |
| JP | 7-18826 B2 | | 3/1995 | |
| JP | 2004-125397 A | | 4/2004 | |
| JP | 2005-315762 A | | 11/2005 | |
| JP | 2008-202961 A | | 9/2008 | |
| JP | 2013-76653 A | | 4/2013 | |

(Continued)

OTHER PUBLICATIONS

Communication dated Nov. 16, 2021 from the China National Intellectual Property Administration in Chinese Application No. 201910832994.6.

(Continued)

*Primary Examiner* — Lisa M Caputo
*Assistant Examiner* — Nasir U. Ahmed
(74) *Attorney, Agent, or Firm* — Sughrue Mion, PLLC

(57) ABSTRACT

A thermal conductivity measuring device includes a sample container that has a plurality of storage sections; a drive unit that is configured to move the plurality of storage sections of the sample container; and a radiation thermometer that is configured to measure the temperature of a predetermined position of the sample container.

16 Claims, 7 Drawing Sheets

(56) References Cited

FOREIGN PATENT DOCUMENTS

JP          2017-125842 A      7/2017
WO     WO-2016027416 A1 *  2/2016   ........... G01N 23/207

OTHER PUBLICATIONS

Qiu Xu et al., "College Physics Experiments", China Agriculture Press, 2007, pp. 1-5 (7 pages total).
Heguo Zhu et al., "Material Science Research and Testing Methods (3rd Edition)", Southeast University Press, 2016, pp. 311-316 (8 pages total).
Office Action dated Jun. 7, 2022, issued in Japanese Application No. 2018-167064.

* cited by examiner

THERMAL CONDUCTIVITY MEASURING DEVICE, HEATING DEVICE, THERMAL CONDUCTIVITY MEASURING METHOD, AND QUALITY ASSURANCE METHOD

BACKGROUND OF THE INVENTION

Field of the Invention

The present invention relates to a thermal conductivity measuring device, a heating device, a thermal conductivity measuring method, and a quality assurance method.

Priority is claimed on Japanese Patent Application No. 2018-167064, filed Sep. 6, 2018, the content of that is incorporated herein by reference.

Description of Related Art

There are mainly a steady method and an unsteady method as thermal conductivity measuring methods. The steady method is a method of applying a steady temperature gradient a sample and measuring thermal conductivity thereof. The unsteady method is a method of applying transitional heat flow energy to a sample and calculating thermal conductivity from temperature response of the sample.

Here, in a case where a high temperature of about 2000° C. is required, for example, in a device for crystal growth of silicon carbide (SiC), it is generally desirable to accurately control the temperature within the device. Therefore, it is important to know in advance the thermal conductivity of a material such as a heat-insulating material to be used in the above device.

In order to obtain the thermal conductivity of the material at a high temperature of about 2000° C., a laser flash method that is an unsteady method can be generally used. However, in the laser flash method, the sample is required to be homogeneous and dense. For this reason, materials unsuitable for the measurement, such as composite materials or laminated materials of fibers or granular materials, are present. Additionally, since a plurality of samples cannot be simultaneously measured, the thermal conductivities of the plurality of samples cannot be simply obtained under the same environment.

As a method of measuring the thermal conductivities by the relative comparison between the plurality of samples for example, Japanese Unexamined Patent Application, First Publication No. H07-18826 discloses a method of heating a back surface of a copper block in which samples are embedded, measuring temperature distributions of the samples and a copper block front surface with a thermal image device, and calculating the thermal conductivities of the samples using a predetermined formula from temperature differences therebetween.

However, Patent Document 1 does not disclose accurately measuring the thermal conductivities of the materials at a high temperature of about 2000° C. Additionally, the temperature of the copper block and the temperatures of the samples are measured at different positions. For this reason, accuracy of the method is low in the comparison of temperatures.

PRIOR ART DOCUMENTS

Patent Documents

Patent Document 1: Japanese Unexamined Patent Application, First Publication No. H07-18826

SUMMARY OF THE INVENTION

Problems to be Solved by the Invention

The invention has been made in view of the above problems, and an object thereof is to provide a thermal conductivity measuring device, a heating device, a thermal conductivity measuring method, and a quality assurance method that can accurately measure thermal conductivities of materials by relative comparison between measured temperatures even at a high temperature of about 2000° C.

Means for Solving the Problems

As a result of keen consideration, the present inventors have found that the thermal conductivities of samples can be accurately measured by relative comparison between measurement temperatures even at a high temperature of about 2000° C. by preparing a sample container having a plurality of storage sections, moving the plurality of storage sections of the sample container, and measuring the temperatures of the samples within a plurality of storage sections at a predetermined position, That is, the invention provides the following means in order to solve the above problems.

(1) A thermal conductivity measuring device according to a first aspect includes a sample container that has a plurality of storage sections; a drive unit that is configured to move the plurality of storage sections of the sample container, and a radiation thermometer that is configured to measure the temperature of a surface of the sample container.

(2) In the thermal conductivity measuring device according to the above aspect, the drive unit may rotate the sample container.

(3) A heating device according to a second aspect includes a heat source; a sample container that is provided on an upper surface or a side surface of the heat source and has a plurality of storage sections; a drive unit that is configured to rotate the heat source and thereby rotate the sample container together with the heat source; and a radiation thermometer that is configured to measure the temperature of a surface of the sample container.

(4) The heating device according to the above aspect may further include a heat-insulating material that covers at least a portion of a surface of the heat source, in which the heat-insulating material forms at least a space that surrounds the sample container, and a surface of sample container opposite to the heat source may be exposed to the space that is surrounded by the heat-insulating material.

(5) A thermal conductivity measuring method according to a third aspect includes a measurement step of moving a standard sample and an object sample to measure temperatures of the standard sample and the object sample at the same position, and a derivation step of obtaining a thermal conductivity of the object sample in a measurement environment on the basis of the respective temperatures measured in measurement step.

(6) In the thermal conductivity measuring method according to the above aspect, in the measurement step, the standard sample and the object sample may be moved and the temperatures of the standard sample and the object sample may be measured at the same position.

(7) A quality assurance method according to a fourth aspect includes a measurement step of moving a first standard sample having a first thermal conductivity value, a second standard sample having a second thermal conductivity value, and an object sample, and measuring temperatures of the first standard sample, the second standard sample, and the object sample at the same position, respectively; and a determination step of determining whether or not a measured third temperature of the object sample falls between a first temperature of the first standard sample and a second temperature of the second standard sample that are measured.

(8) In the thermal conductivity measuring device according to the first aspect, the drive unit may be configured to rotate the sample container, and the radiation thermometer may be fixed and measure each temperature of the surfaces of the storage sections of the sample container which is rotated.

(9) In the thermal conductivity measuring device according to the first aspect, the sample container may have a doughnut-like disk shape, or cylindrical shape.

(10) In the thermal conductivity measuring device according to the first aspect, the sample container may have a circle shape or a doughnut shape in a plan view, and the sample container may be rotatable by the drive unit, and the sample container may have an exposed main surface which may be selected from an upper surface, a side surface and a lower surface thereof, and the storage sections, in which a sample to be measured can be installed, may be provided in the exposed main surface, and the radiation thermometer fixed at a position which faces to the exposed main surface.

(11) The heating device according to the second aspect, wherein the heat-insulating material described in (4) may have a first part which surrounds a lateral side of the heat source, a second part which surrounds an upper side of the heat source, and a third part which surrounds a lower side of the heat source, wherein the first part and the third part may form a first space in which the heat source is provided, and the second part may form a second space in which the sample container is provided, thickness of the first part may be larger than that of the second part, and the second part may have a temperature measurement hole for the radiation thermometer.

(12) The heating device according to the second aspect, wherein the heat-insulating material described in (4) may have a first part which surrounds a lateral side of the heat source, a second part which surrounds an upper side of the heat source, and a third part which surrounds a lower side of the heat source, wherein the first part may have a temperature measurement hole for the radiation thermometer.

(13) The thermal conductivity measuring method according to the third aspect, wherein, in the measurement step, measurement environment is selected, environments set to the selected measurement environment, and the temperatures of the samples are measured using a fixed radiation thermometer under the selected and set measurement environment.

(14) The thermal conductivity measuring method according to the third aspect, wherein the derivation step may include:

a step of forming a calibration curve using simulation, wherein known thermal conductivities of the standard sample and a comparative sample are provided on a horizontal axis, and a difference obtained by subtracting a measured temperature of the comparative sample from a measured temperature of the standard sample is provided on a vertical axis, wherein the measured temperatures are obtained in simulation, and a step of determining the thermal conductivity of the object sample by obtaining a difference between the temperature of the standard sample and the temperature of the object sample measured in the measurement step, and applying the difference to the calibration curve.

(15) The thermal conductivity method according to the third aspect, wherein the temperatures of at least two standard samples and at least one object sample may be measured at the same position in the measurement step and, in the derivation step, a confirmation may be performed whether or not there is a combination of the measured temperatures of the standard samples wherein the measured temperature of the object sample falls between the measured temperatures of the standard samples, and if there is such a combination, it may be determined that the object sample has a thermal conductivity which falls between thermal conductivities of the standard samples in the combination.

(16) The quality assurance method according to the fourth aspect, wherein the temperatures of the standards samples and the object sample may be measured in the measurement step with fixed radiation thermometer.

(17) The quality assurance method according to the fourth aspect, wherein a thermal conductivity measuring device may be used, wherein the device may comprise:

a sample container that has a plurality of storage sections;

a drive unit that is configured to move the plurality A storage sections of the sample container; and a radiation thermometer that is configured to measure a temperature of a surface of the sample container.

(18) The quality assurance method according to the fourth aspect, wherein the thermal conductivity measuring device may include a heat source which is located to contact with the sample container, and the drive unit may be configured to rotate the sample container.

Effects of the Invention

By using the thermal conductivity measuring devices according to the above aspects, thermal conductivities of materials can be accurately measured by relative comparison between the measurement temperatures of the samples even at a high temperature of about 2000° C.

DETAILED DESCRIPTION OF THE INVENTION

Hereinafter, the present embodiment showing a preferable example of the invention will be appropriately described in detail with reference to the drawings. The drawings to be used in the following description may be shown such that feature portions are enlarged for convenience in order to make the features of the invention easily understood, and the dimension, scales or the like of respective components may be different from actual dimension and scales. The materials, dimensions, and the like that are exemplified in the following description are merely examples, the invention is not limited to these, and it is possible to appropriately change and carry out the invention without changing the gist of the invention. For example, unless there is particular limitation, number, shape, size, distance, and the like may be changed, added, and omitted as necessary. Additionally, first to fourth aspects of the invention may preferably share mutual features and conditions.

[Thermal Conductivity Measuring Device]

Figure 1:
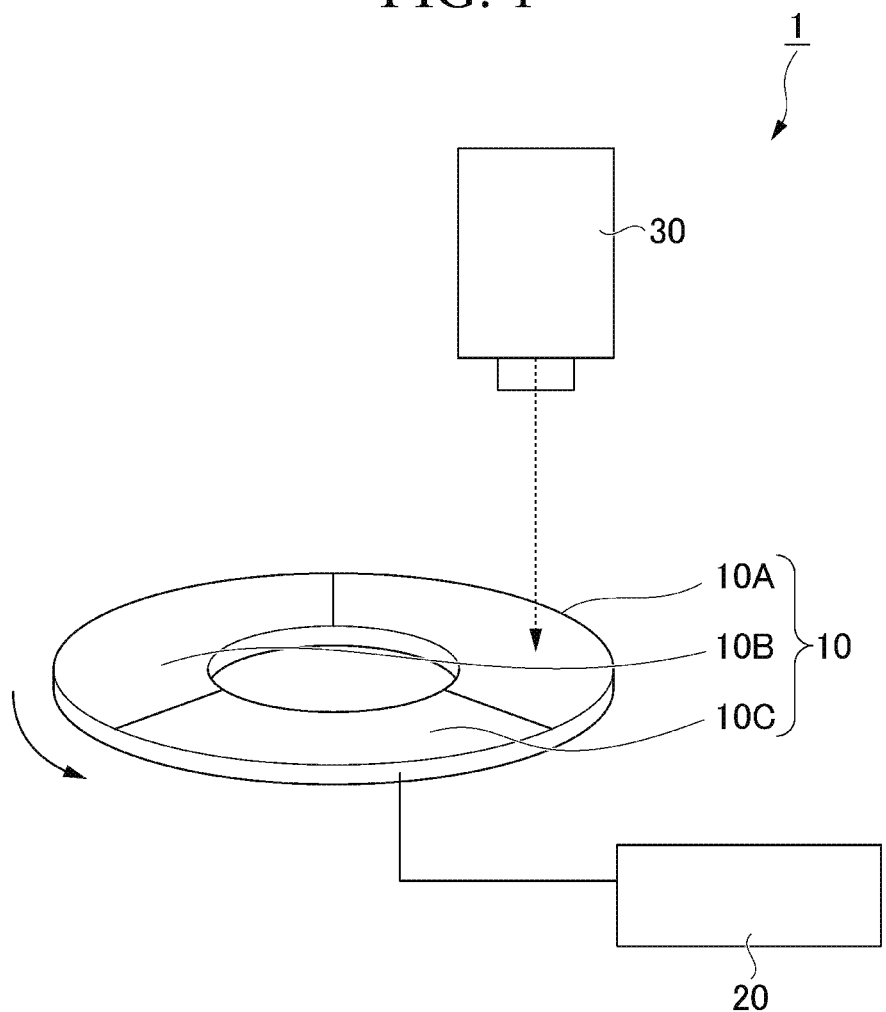
FIG. 1 is a schematic view showing a preferable example of a thermal conductivity measuring device according to the present embodiment.

FIG. 1 is a schematic view showing a preferable example of a thermal conductivity measuring device according to the present embodiment. As shown in FIG. 1, a thermal conductivity measuring device 1 has a sample container 10, a drive unit 20, and a radiation thermometer 30.

(Sample Container)

The sample container 10 has a plurality of storage sections. Although three storage sections 10A, 10B, and 10C are shown in FIG. 1 as an example, the number of storage sections is not limited. One or more standard samples having known thermal conductivity, and one or more object samples needed to obtain thermal conductivity are installed in the storage sections. For example, a standard sample is installed in a storage section 10A, a first object sample is installed in a storage section 10B, and a second object sample is installed in a storage section 10C. An object sample can be arbitrarily selected regardless of the form thereof. For example, when the object sample is solid, the object sample may have a particle form or may have a filler form. The standard sample may be anything as long as the thermal conductivity is known. For example, the standard sample may be gas or solid, and if a specific example is given, gas, such as argon, can be preferably used. The object sample is intended to measure the thermal conductivity, and include, for example, carbon fiber felt in which carbon fiber is three-dimensionally orientated. In addition, the form and size of the storage sections can be arbitrarily selected, and storage sections in which no sample is installed may be adopted as necessary.

It is desirable that the sample container is provided with a lid made of graphite after a sample S serving as the object sample is filled with a storage section. Measurement accuracy can be enhanced by making the emissivity of a surface of which the temperature is measured by the radiation thermometer constant.

In addition, in a case where the lid is used, it is preferable that all of the storage sections wherein e standard sample or the object sample are provided are covered with the lid(s). In addition, when the standard sample is gas, an internal space of the chamber in which the sample container is provided may be set to the atmosphere of the gas.

The shape of e sample container 10 is shown as a circular shape in a plan view in FIG. 1. However, as long as the temperature of a sample within each storage section is measured in a given time in order by the radiation thermometer 30, the shape is not limited particularly. The shape of the sample container 10 may be an elliptical shape, a rectangular shape, or a polygonal shape in the plan view. Additionally, the sample container 10 may have a shape in which a hole is made at the center thereof, for example, a doughnut shape in the plan view as shown FIG. 1 such that the drive unit 20 is fitted thereinto. The sample container may be rotatable around a central axis as a rotation axis, and may have a doughnut type disc shape, or a tube shape, such as a cylindrical shape. In addition, it is also preferable that the storage sections are disposed continuously or at a distance from each other, for example, at regular intervals or arbitrarily selected intervals. For example, the storage sections may be disposed at continuously or at intervals on a circle which has a center on the central axis of the sample container. Otherwise, the storage sections may be disclosed linearly continuously or at intervals on a sample container of an arbitrary shape.

(Drive Unit)

As long as the drive unit 20 can move the sample within each storage section to under the radiation thermometer, the drive unit 20 is not limited particularly. For example a rotatable rotation shaft, which is provided at the central axis of the sample container 10, can be used as the drive unit 20. The drive unit 20 may move the storage sections 10A, 10B, and 10C of the sample container 10 by rotation, or may move the storage sections 10A, 10B, and 10C of the sample container 10 by translation in line. The drive unit 20 shown in FIG. 1 rotates the circular sample container 10, and moves the sample within each storage section to under the radiation thermometer 30.

The drive unit 20 may have such a shape that the drive unit is fitted into the hole of the doughnut-shaped sample container 10.

(Radiation Thermometer)

The radiation thermometer 30 measures the temperature of a predetermined position of the sample container 10. The radiation thermometer 30 is fixed at the predetermined position. In the sample container 10 shown FIG. 1, the positions of the respective storage section 10A, 10B, and 10C change depending on the rotation of the sample container. As the positions of the respective storage sections 10A, 10B, and 10C change relative to the measurement point where the radiation thermometer 30 is fixed, the temperatures of the respective storage sections 10A, 10B, and 10C are measured at different timings, respectively. As long as a high temperature of about 2000° C. can be measured, the radiation thermometer 30 is not limited particularly. The position of the radiation thermometer 30 may be fixed at a position that faces the exposed principal surface of the sample container. Although it is preferable that there is no obstruction between the radiation thermometer 30 and the sample container 10, the invention is not limited only to this condition in a case where there is no problem in measurement. The distance between the radiation thermometer 30 and the sample container 10 can be arbitrarily selected.

By using such a thermal conductivity measuring device 1, the temperature of the standard sample and the temperature of an object sample can be measured completely under the same environment. Additionally, the thermal conductivity can be accurately obtained from a temperature difference measured between the standard sample and the object sample. Moreover, by installing the thermal conductivity measuring device 1 in an environment (for example, a specific temperature, an inert-gas type, an atmosphere pressure, or the like) where the object sample is used in practice, the thermal conductivity under the environment to be actually used can be accurately measured. The thermal conductivity measuring device 1 and the heating device to be described below may be used in a hermetically sealed or substantially hermetically sealed state. When the sample container is covered with the lid, the temperature of the lid (the temperature of the surface of the sample container) may be measured.

[Heating Device]

Figure 2:
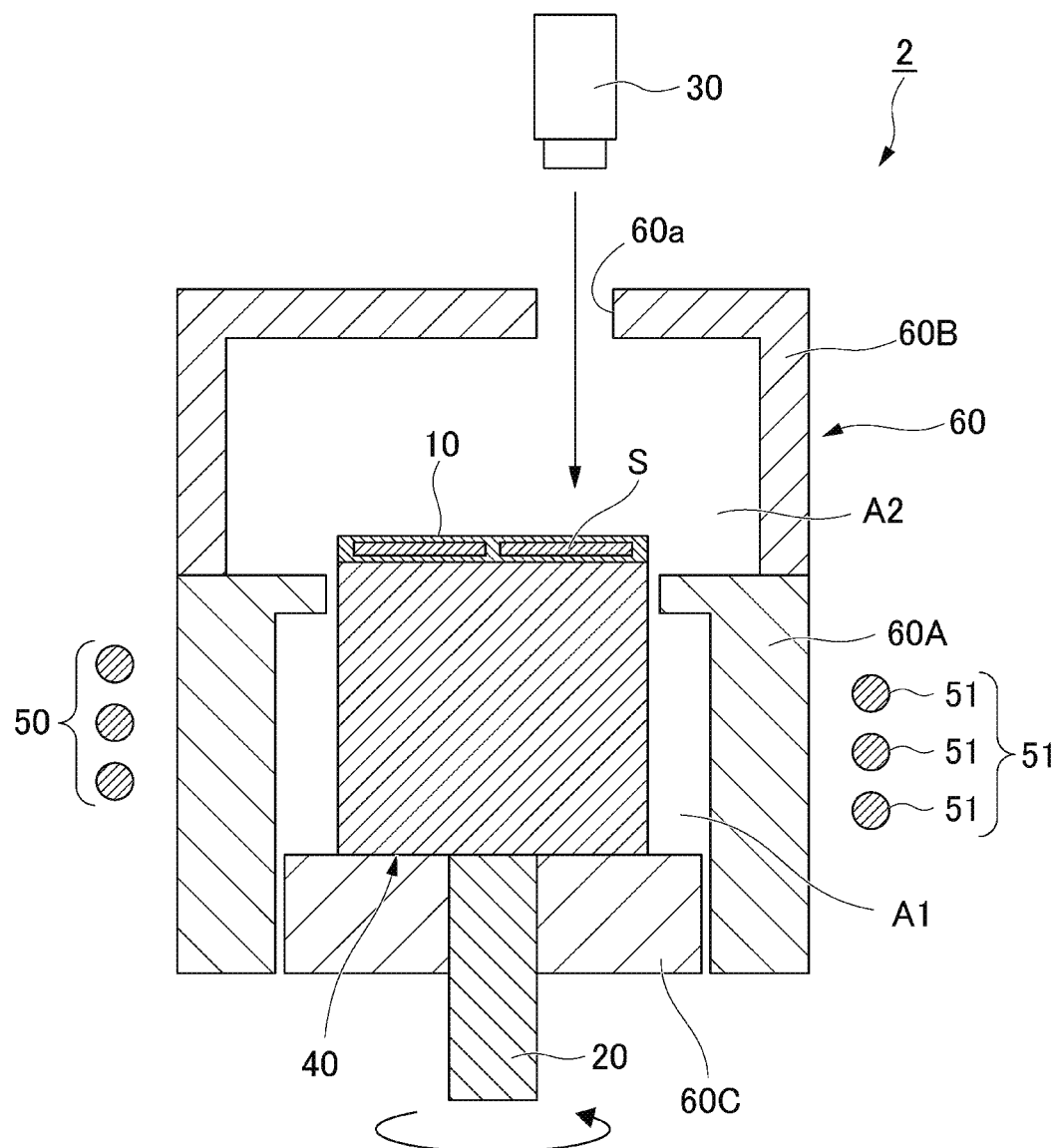
FIG. 2 is a sectional schematic view showing a preferable example of a heating device according to the present embodiment.

FIG. 2 is a sectional schematic view showing a preferable example of the heating device according to the present embodiment. The heating device 2 shown in FIG. 2 has a heat source 40, the sample container 10, the drive unit 20, heating means 50 (heating element), the radiation thermometer 30, and a heat-insulating material 60. In this heating device, it is also possible to select and set conditions other than temperature, for example, the type of inert gas and atmosphere pressure, as necessary.

(Heat Source)

Graphite can be used for the heat source 40. The heat source 40 is heated by an induced current from the heating means 50 to be described below. Additionally, heater, such as a resistance heating heater, may be used as the heat source 40 without using the heating means 50. The shape of the heat source 40 can be arbitrarily selected, for example, may be a circular column shape, a polygonal column, or the like. The temperature to be applied by the heat source 40 can be arbitrarily selected. For example, the temperature may be 1500 to 2300 degrees, may be 1700 to 2100 degrees and may be 1800 to 2000. However, the temperature is not limited only to these temperatures.

(Sample Container)

The sample container 10 is installed on an upper surface of the heat source 40. The sample container 10 is the same container as the sample container 10 in the above-described thermal conductivity measuring device 1. The sample container 10 is provided with the plurality of storage. The rotation axis of the sample container 10 shown in FIG. 2 coincides with the rotation axis of the heat source 40. Since the rotation axes coincide with each other, the position of the sample container 10 does not shift in a case where the heat source 40 and the sample container 10 are rotated together. As the heat source 40 is rotated by the drive unit 20, the sample container 10 is also rotated together with the heat source 40. Since the storage sections 10A, 10B, and 10C of the sample container 10 are as described above, a detailed description thereof will be omitted.

(Drive Unit)

The drive unit 20 rotates the heat source 40 and the sample container 10 together. The configuration of the drive unit 20 is not limited particularly. The drive unit may be, for example, a rotating rotation shaft that is connected to the heat source 40 as shown in FIG. 2. As the rotation shaft rotates, the heat source 40 rotates and the sample container 10 also rotates.

(Heating Means)

The heating means 50 as a heating element dudes a coil 51. The heating means 50 uses a direct heating type high-frequency induction heating method in which the heat source 40 generates heat by applying an alternating current to the coil 51. In the heating device 2, the heat source 40 generates heat by applying the alternating current to the coil 51.

The coil 51 surrounds the heat source 40. An induction coil to be used for induction heating can be used for the coil 51.

(Heat-Insulating Material)

The heat-insulating material 60 surrounds the periphery of the heat source 40. The heat-insulating material 60 prevents the heated heat source 40 from being cooled. The heat-insulating material 60 is provided with a temperature measurement hole 60a for the radiation thermometer 30.

The heat-insulating material 60 shown in FIG. 2 has a first portion 60A, a second portion 60B, and a third portion 60C. The first portion 60A surrounds a lateral side of the heat source 40. The second portion 60B covers an upper side of the heat source 40. The third portion 60C covers a lower side of the heat source 40. The first portion 60A and the third portion 60C form a first space A1. The second portion 60B forms a second space A2. The heat source 40 is housed within the first space A1, and the sample container 10 is housed within the second space A2. The first portion 60A and the third portion 60C are separated from each other in order to make the heat source 40 rotatable.

The thickness of the first portion 60A is larger than the thickness of the second portion 60B. Heat does not easily escape from the first portion 60A relative to the second portion 60B, and the temperature of the first space A1 becomes higher than the temperature of the second space A2. As a result, the flow of the heat is directed from the first space A1 to the second space A2. In other words, the temperature distribution in the sample container 10 is formed in a thickness direction of the sample container 10 from the heat source 40 side that is high in temperature toward the second space A2 that is low in temperature. If the temperature distribution has one direction, the thermal conductivities of the object samples stored within the storage sections 10A, 10B, and 10C of the sample container 10 can be accurately measured.

(Radiation Thermometer)

The same one as that of the above-described thermal conductivity measuring device 1 is used for the radiation thermometer 30. The radiation thermometer 30 is located on a straight line that connects the predetermined position of the container 10 and the temperature measurement hole 60a to each other. Radiation thermometers have large individual differences in the measurement of a high-temperature environment of 1500° C. Or higher, and there is a difference in temperature display value in a case where different thermometers are used. In the heating device 2, measurement of a plurality of samples can be measured by the same thermometer. For this reason, the measurement accuracy of relative comparison is high.

In the heating device 2, as the sample container 10 rotates, a temperature-measured portion of the sample container 10 changes with the elapse of time. That is, different samples can be moved to the predetermined measurement position one after another by the rotation. On the other hand, the measurement position of the radiation thermometer 30 does not change. That is, the heating device 2 can measure the temperature of the standard sample and the temperature of an object sample, which are stored in the sample container 10, under the same environment. Additionally, the heating device 2 can obtain the thermal conductivity of the object sample accurately from a temperature difference between the standard sample and the object sample. Here, even in the same material, if surrounding environment is different, for example, if the inert-gas type, atmosphere pressure, temperature, and the like to be used change, there is a case that values to be measured such as the thermal conductivity change due to various factors. In the heating device 2, it is possible to simultaneously measure the plurality of samples under the same environment. Therefore, regarding the plurality of samples, the thermal conductivities on the environment to be used in practice can be obtained by simultaneously and relatively comparing with each other. For this reason, the thermal conductivities are very useful for comparison of heat-insulating performance, or the like. In addition, the number of times of measurement by the radiation thermometer 30 and other conditions may be arbitrarily selected.

Figure 3:
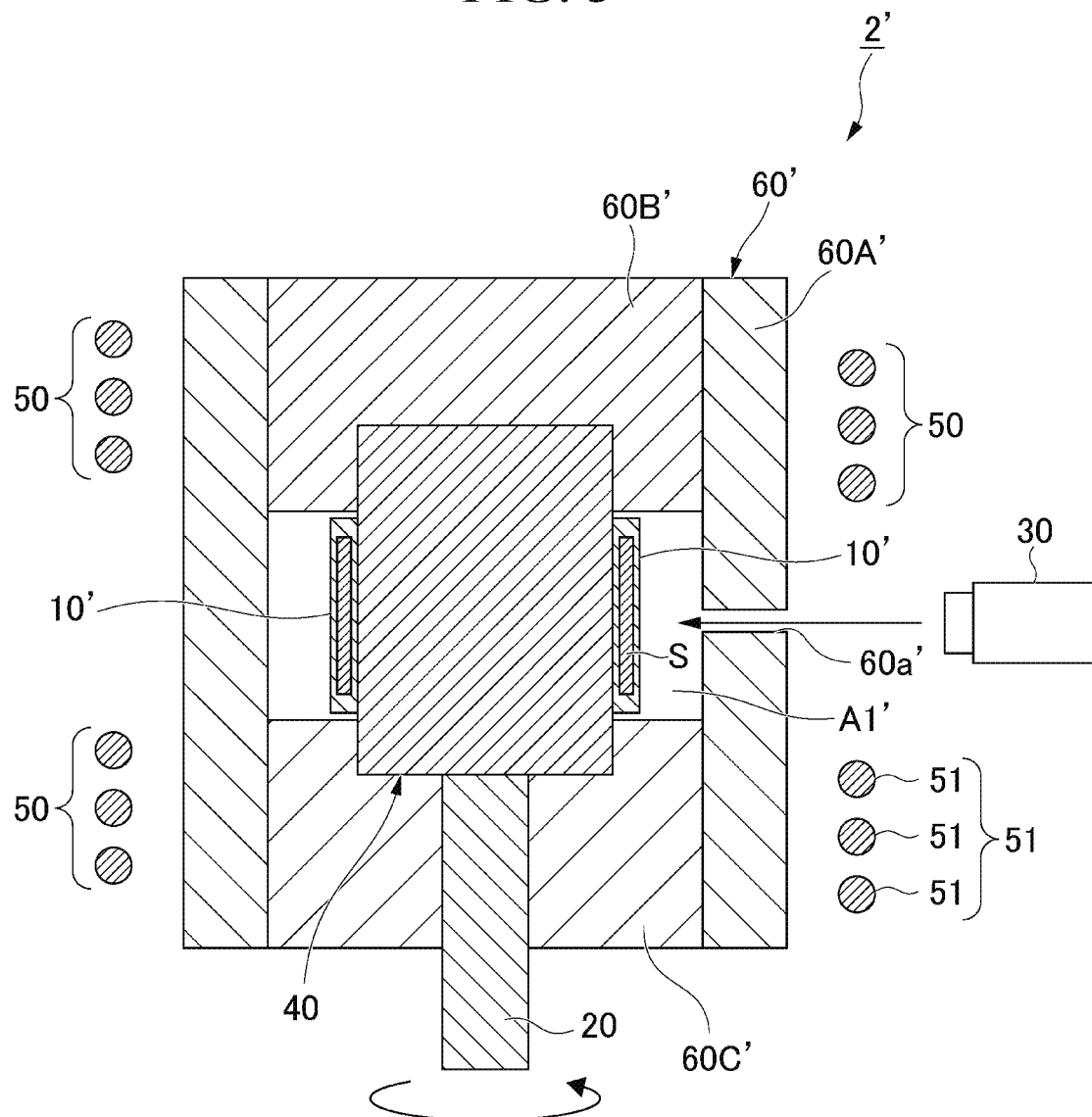
FIG. 3 is a sectional schematic view showing another example of the heating device according to the present embodiment.

FIG. 3 is a sectional schematic view of another example of the heating device according to the present embodiment. Similarly to FIG. 2, a heating device 2' has the heat source 40, a sample container 10', the drive unit 20, the heating means 50, the radiation thermometer 30, and a heat-insulating material 60'. The same components as those of the heating device 2 shown in FIG. 2 will be designated by the same reference signs.

Figure 4:
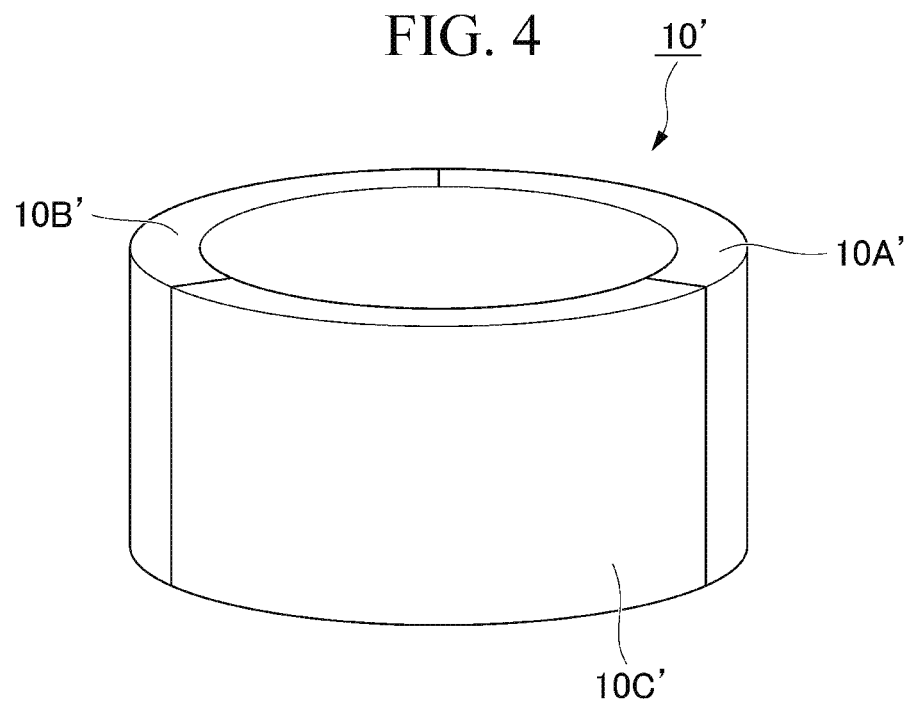
FIG. 4 is a schematic showing a sample container taken out from said another example of the heating device according to the present embodiment.

In the heating device 2' shown in FIG. 3, the sample container 10' is installed on an outer lateral surface of the heat source 40. FIG. 4 is a schematic view showing the sample container 10' taken out from the heating device 2' according to the present embodiment. The sample container 10' shown in FIG. 4 is annular. The sample container 10' includes a plurality of storage sections 10A', 10B, and 10C in a circumferential direction. A standard sample or an object sample is stored in the plurality of storage sections 10A, 10B, and 10C.

The heat-insulating material 60' shown in FIG. 3 has a temperature measurement hole 60a' on a lateral side of the heat source 40. The heat-insulating material 60' has a first portion 60A', a second portion 60B', and a third portion 60C'. The first portion 60A' surrounds the lateral side of the heat source 40. The second portion 60B' covers the upper side of the heat source 40. The third portion 60C' covers the lower side of the heal source 40. The first portion 60A', the second portion 60B', and the third portion 60C' are separated from each other in order to make the heat source 40 rotatable. The first portion 60B' and the third portion 60C' can rotate together with the heat source 40. The first space A1' for housing the sample container 10' is formed on the lateral side of the heat source 40. The thickness of the first portion 60A' may be larger or smaller than the thickness of the second portion 60B' and the third portion 60C.

The upper side and the lower side of the heat source 40 are covered with the second portion 60B' and third portion 60C', and there is the first space A1' on the lateral side. As a result, the flow of the heat is directed from the heat source 40 to the lateral side. In other words, the temperature distribution in the sample container 10' is formed in the thickness direction of the sample container 10' from the heat source 40 side that is high in temperature toward the first space A1' that is low in temperature. If the temperature distribution has one direction, the thermal conductivity of the object samples stored within the storage sections 10A', 10B', and 10C' of the sample container 10' can be accurately measured.

In the heating device 2', as the sample container 10' rotates, a temperature-measured portion of the sample container 10' changes with time. On the other hand, the measurement position measured by the radiation thermometer 30 does not change. That is, the heating device 2' can measure the temperature of the standard sample and the temperature of an object sample under completely the same environment. Additionally, the heating device 2' can obtain the thermal conductivity of the object sample accurately from a temperature difference between the standard sample and the object sample. Additionally, in the heating device 2', the sample container 10' is installed on the lateral surface of the heat source 40. Thus, the heating device is very useful, when the thermal conductivity of the heat-insulating material or the like which is used in practice so as to be wound is obtained.

[Thermal Conductivity Measuring Method]

A thermal conductivity measuring method according to the present embodiment has a measurement step of moving a standard sample and an object sample to measure temperatures of the standard sample and the object sample at the same position, and a derivation step of obtaining the thermal conductivity in the measurement environment of the object sample on the basis of the respective temperatures measured in the measurement step.

In addition, the standard sample and the object sample may be stored in the above-described sample container. Additionally, the standard sample and the object sample may be heated to arbitrarily selected temperatures by a heat source. The above-described thermal conductivity measuring device and heating device can be preferably used for the present method.

<Measurement Step>

In the measurement step, the standard sample and the object sample are moved and the temperatures of the standard sample and the object sample are measured at the same position. For example, using the thermal conductivity measuring device 1 as shown in FIG. 1, a measurement point of the temperatures is fixed and the standard sample and the object sample are moved relative to the measurement point. The movement of the standard sample and the object sample may be translation or rotation. If the standard sample and the object sample are rotated, the temperatures corn be continuously measured over a plurality of times in the same system. In the measurement step, a temperature difference between the standard sample and the object sample under the same environment can be obtained. As long as the number of times by that one sample is measured is 1 time or more, the number of times is not limited to, for example, the number may be 1 to 1000 times, or may be 5 to 300 times or may be 10 to 100 times.

In this step, the measurement environment may be arbitrarily selected and set. In addition, specific examples of the environment that can be selected, includes temperature, pressure, and/or the type of atmosphere gas, such as inert gas, the invention is not limited only to these.

Additionally, the measurement can be performed after heating or during heating by providing a heat source. It is preferable to measure the respective temperatures of the samples in a steady state which is provided due to heating. Conditions related to the heating and the number of times of measurement of the same samples can be arbitrarily selected.

The above temperature measurement can be performed from arbitrary directions as long as the measuring device and the measurement position are fixed. For example, the temperature measurement may be performed in a direction perpendicular to the direction of a rotation axis as in the device shown in FIG. 2, or may be performed in a direction horizontal to the direction of the rotation axis as in the device shown in FIG. 3.

<Derivation Step>

In the derivation step, the thermal conductivity of the object sample in the measurement environment is obtained on the basis of the respective temperatures measured by the measurement step.

(Method of Using Simulation (First Method))

As a first method of deriving the thermal conductivity, there is a method of using results of the simulation together. For example, first, a simulation model in which, an actual system such as the thermal conductivity measuring device of FIG. 2 is supposed is created. Next, the standard sample and various materials having various thermal conductivities (comparative samples) are put into the storage sections of the simulation model, and temperatures of tops at the positions of the respective samples are calculated by the simulation. As a result, the temperatures of the tops of the samples are obtained, respectively. Then, a calibration curve is created using the calculation results by plotting well-known thermal conductivities of these materials on a horizontal axis and plotting temperature differences obtained by subtracting the top temperatures of these materials from the top temperature of the standard sample on a vertical axis. Finally, in the measurement step, in an actual device, for example, in a thermal conductivity measuring device shown in FIG. 2, respective temperatures (top temperatures) are measured using a standard sample (a standard sample used in the simulation) and an object sample, and a temperature difference, which is obtained by subtracting the measurement temperature of the object sample from the temperature of the standard sample, is obtained using the obtained values. Then, the thermal conductivity of the object sample is obtained from the temperature difference, using the created calibration curve.

In addition, in a case where the calibration curve is used, a sample showing the highest top temperature may be selected as the standard sample.

As described above, the calibration curve can be created using the simulation by plotting well-known thermal conductivities of the standard sample and comparison samples on a horizontal axis, and by plotting differences between measurement temperature of the standard sample and the measurement temperatures of the comparison samples, which are obtained by the simulation, on a vertical axis. Then, a difference between the temperature of the standard sample and the temperature of the object sample, which are obtained in the measurement step, can be similarly calculated, and the thermal conductivity of the object sample can be obtained from the difference according to the calibration curve.

(Method of Using a Plurality of Standard Samples (Second Method))

Figure 5:
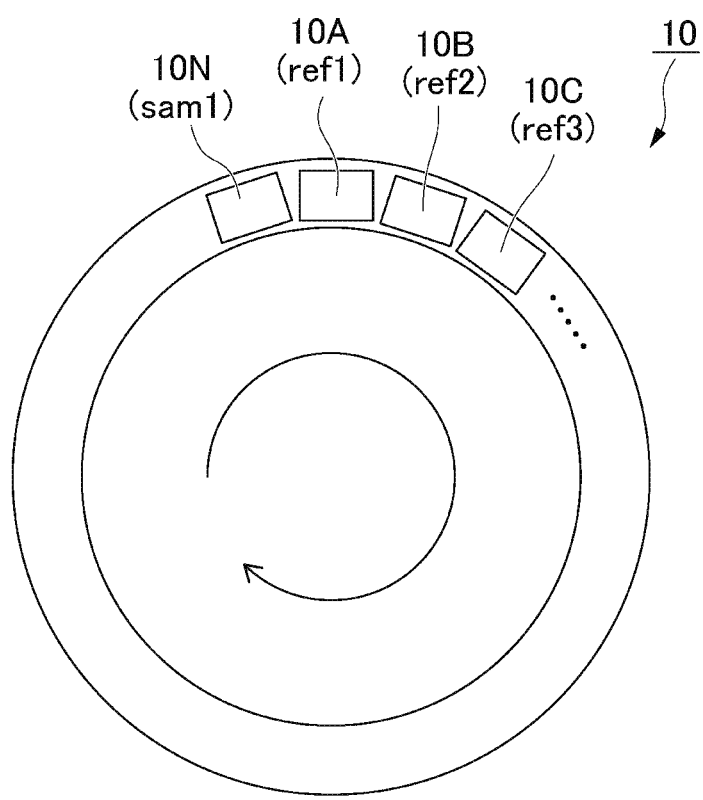
FIG. 5 is a schematic view showing a preferable example of a sample container to be used for a thermal conductivity measuring method using a second method.

As a second method of deriving the thermal conductivity, there is a method of obtaining the thermal conductivity of an object sample from results of temperature measurement of a plurality of standard samples and at least one object sample. FIG. 5 is a schematic view showing an example of the sample container 10 to be used for a thermal conductivity measuring method using the second method. The sample container 10 shown in FIG. 5 has a plurality of storage sections 10A to 10N.

Figure 6:
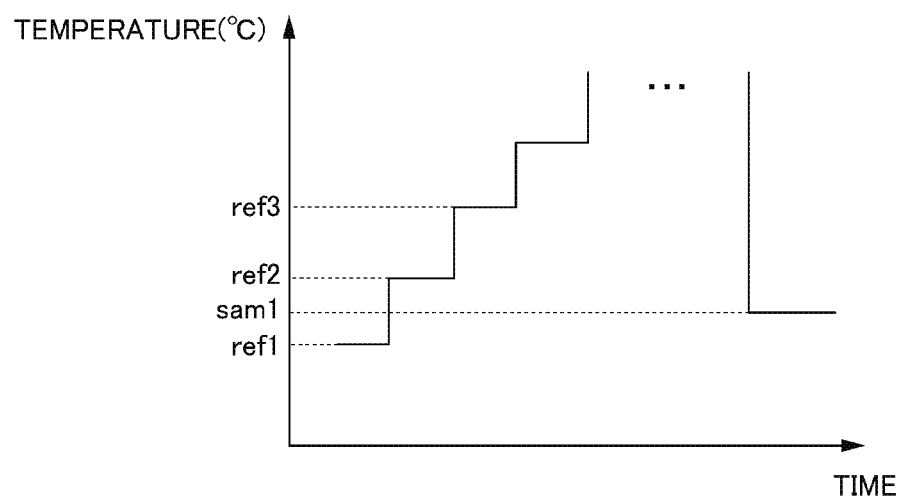
FIG. 6 is a schematic view for showing the thermal conductivity method using the second method.

FIG. 6 is a schematic view for showing the thermal conductivity measuring method using the second method. In FIG. 6, results which are obtained by rotating the sample container and sequentially measuring the temperatures of standard samples ref1, ref2, and ref3 are graphically shown.

The standard samples (ref1, ref2, ref3 . . . ) having known thermal conductivities are prepared and installed in a plurality of storage sections 10A, 10B, 10C . . . of the sample container 10 shown in FIG. 5. Next, an object sample (sam1) is installed in a storage section 10N of the sample container 10. The object sample (sam1) may be one or more.

Respective temperatures are measured using the radiation thermometer while the sample container 10 is rotated.

Then, after the respective temperatures are brought into a steady state, that is, after the temperatures of the respective samples do not change, the temperature of the object sample is compared with the temperatures of the plurality of standard samples. If the temperature of the object sample (sam1) falls, for example, between the temperature of the first standard sample (ref1), and the temperature of the second standard sample (ref2), the thermal conductivity of the object sample (sam1) is determined to be between the thermal conductivity of the first standard sample (ref1) and the thermal conductivity of the second standard sample (ref2). In the present method, the thermal conductivity of the object sample can be accurately obtained by increasing the number of standard samples.

(Quality Assurance Method)

Additionally, the above thermal conductivity measuring method can be used for, for example, the quality assurance of heat-insulating performance specification or the like.

The quality assurance method according to the present embodiment has a measurement step and a determination step.

In the measurement step, a first standard sample having a first thermal conductivity value, a second standard sample having a second thermal conductivity value, and an object sample (evaluation object sample) are moved, and the temperatures of the first standard sample, the second standard sample, and the object sample are measured at the same position, respectively. The temperatures measured from these samples are defined as a first temperature, a second temperature, and a third temperature, respectively.

In the determination step, it is determined whether or not the measured third temperature of the object sample falls between the first temperature of the first standard sample and the second temperature of the second standard sample that are measured.

Specifically, for example, first, a standard sample A having a thermal conductivity value of an upper limit of required heat-insulating performance, and a standard sample B having a thermal conductivity value of a lower limit of the required heat-insulating performance are prepared. Next, the standard sample A, the standard sample B, and one or more object samples are installed in the respective storage sections of the sample container, and respective temperatures thereof are measured using the radiation thermometer. Then, after the respective temperatures are brought into a steady state, a temperature $T_C$ of an object sample is compared with a temperature $T_A$ of the standard sample A and a temperature $T_B$ of the standard sample B. If $T_C$ falls between $T_A$ and $T_B$, $T_C$ is determined to be accepted, and if not, $T_C$ is determined to be rejected.

In this way, in the thermal conductivity measuring method according to the present embodiment, the temperature of the standard sample and the temperature of an object sample can be measured completely under the same environment. For that reason, the thermal conductivity can be accurately obtained from a temperature difference between the standard sample measured and the object sample.

Although the embodiments of the invention have been described above in detail with reference to the drawings, the respective configurations and combinations thereof in the respective embodiments are examples, additions, omissions, substitutions, and other modifications of components can be made without departing from the concept of the invention.

EXAMPLES

Example 1

Figure 7:
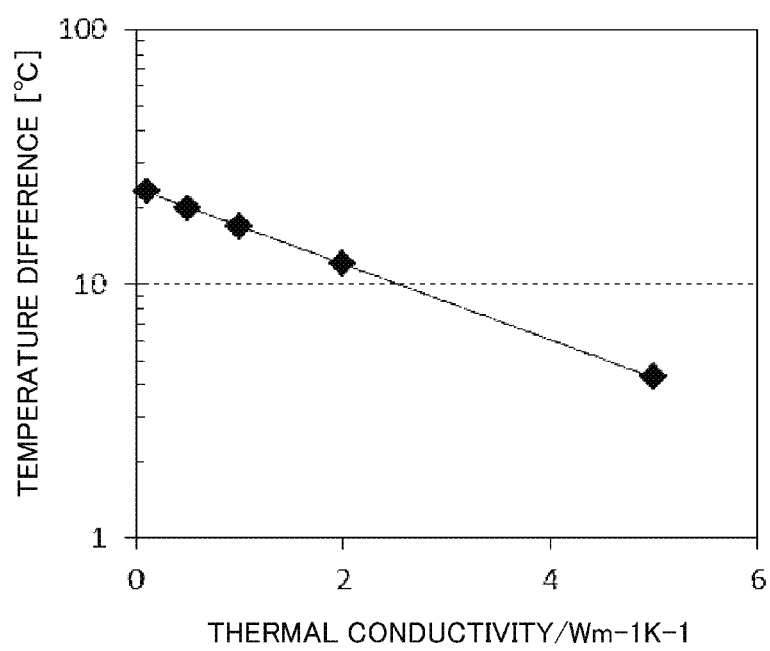
FIG. 7 is a view showing a calibration curve in a relationship between a difference between the temperature of a sample container top filled with argon (standard sample A) and the temperatures of container tops filled with respective materials, and the thermal conductivity, according to steady state simulation.

First, a simulation model in which an actual system is supposed was created. As a system of the simulation model, a sample container having a plurality of storage sections was heated by a heat source disposed under the container. Next, a standard sample A (argon, 700 Torr) and materials having a thermal conductivity of 0.1, 0.5, 1, 2, and 5 W/mK are put into the storage sections of the simulation model, and the temperatures of container tops of the positions of the respective samples were calculated. The calculation results are shown in Table 1. Then, using Table 1, a calibration curve was created using exponential approximation by plotting thermal conductivities on a horizontal axis and plotting temperature differences from the top temperature of the standard sample A on a vertical axis. The created calibration curve is shown in FIG. 7.

TABLE 1

| Material Put Into Storage Section | Top Temperature By Simulation (° C.) | Temperature Difference From Top Temperature of Argon 700 Torr (° C.) |
|---|---|---|
| Material of Thermal Conductivity 0.1 W · mk | 1962.2 | 23.25 |
| Material of Thermal Conductivity 0.5 W · mk | 1965.45 | 20 |
| Material of Thermal Conductivity 1 W · mk | 1968.71 | 16.74 |
| Material of Thermal Conductivity 2 W · mk | 1973.49 | 11.96 |
| Material of Thermal Conductivity 5 W · mk | 1981.16 | 4.29 |
| Argon 700 Torr | 1985.45 | — |

Next, measurement was performed in an actual device in which the sample container having the plurality of storage sections is rotated by a drive unit, wherein the sample container was heated by the heat source disposed under the container. Argon (standard sample A), the first object sample, and the second object sample were installed in the respective storage sections of the sample container. After each sample was installed in the storage sections, each storage section was covered with a lid. Then, the sample container s installed on an upper surface of the heat source, the sample container was rotated at 0.25 rpm using the drive unit, and the temperatures of the surface of the respective storage sections were measured every 10 seconds using the fixed radiation thermometer. A graph obtained by plotting the temperatures of the respective samples measured by the radiation thermometer with respect to time is shown in FIG. 8.

Figure 8:
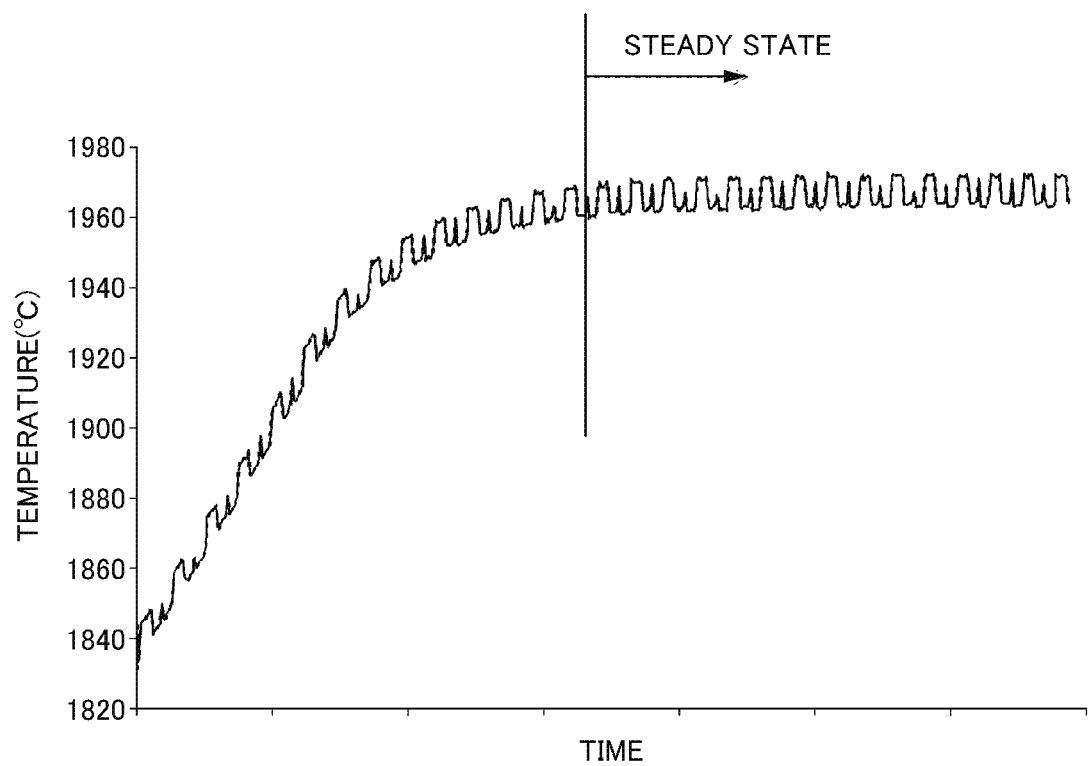
FIG. 8 is a view showing a graph obtained by plotting the temperatures of respective samples measured, by the radiation thermometer with respect to time.
Figure 9:
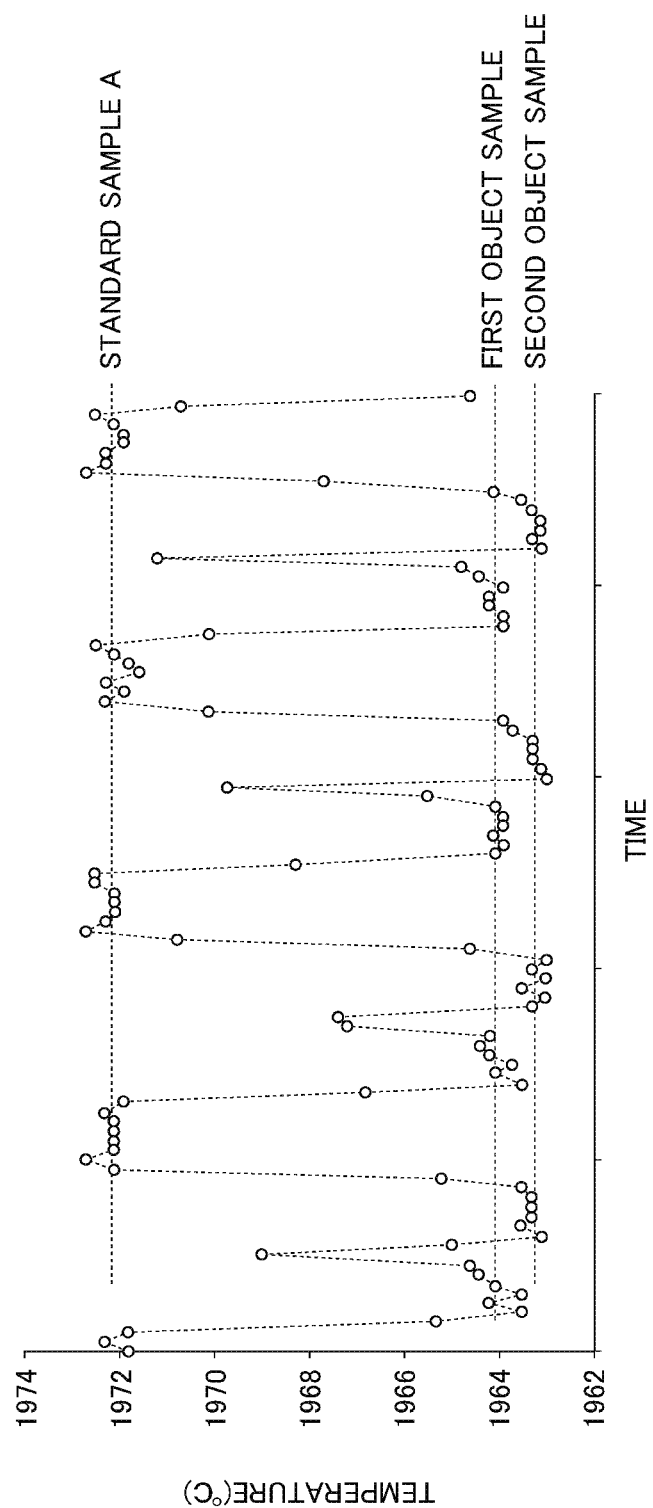
FIG. 9 is a view showing a graph in which a portion (a portion after an arrow) brought into a steady state in FIG. 8 is enlarged.

An enlarged view of a portion (a portion after an arrow) brought into a steady state of FIG. 8 is shown in FIG. 9. It can be seen from FIG. 9 that the temperature of argon (standard sample A) and the temperature of the first object sample, the temperature of the second object sample, are different from each other, respectively. A mean temperature was determined from plot values of FIG. 9, and a temperature difference between the temperature of argon (standard sample A) and the temperature of the first object sample and a temperature difference between the temperature of argon (standard sample A) and the temperature of the second object sample were calculated. Then, the thermal conductivities of the first object sample and the second object sample are obtained from the graph of FIG. 7, using the calculated temperature difference. The results are shown in Table 2.

TABLE 2

| | Standard Sample A (700 Torr Argon) | First Object Sample | Second Object Sample |
|---|---|---|---|
| Maximum (° C.) | 1971.6 | 1963.5 | 1962.6 |
| Minimum (° C.) | 1970.1 | 1962.0 | 1961.3 |
| Average (° C.) | 1970.76 | 1962.83 | 1962.05 |
| Temperature Difference From Standard Sample A (° C.) | | 7.93 | 8.71 |
| Thermal Conductivity 3 (W/m · k) | | 3.20 | 2.93 |

As shown in Table 2, the thermal conductivities of the first object sample and the second object sample could be obtained from the temperature difference between the temperature of argon (standard sample A) and the temperature of the first object sample and the temperature difference between the temperature of argon (standard sample A) and the temperature of the second object sample.

INDUSTRIAL APPLICABILITY

It is possible provide the thermal conductivity measuring device, the heating device, the thermal conductivity measuring method, and the quality method that can accurately measure the thermal conductivities of the materials by the relative comparison between the measurement temperatures even at a high temperature of about 2000° C.

EXPLANATION OF REFERENCES

1: thermal conductivity measuring device
2, 2': heating device
10, 10': sample container
10A, 10B, 10C, 10N, 10A', 10B', 10C': storage section
20: drive unit
30: radiation thermometer
40: heat source
50: heating means
51: coil
60, 60': heat-insulating material
60A, 60A': first portion
60B, 60B': second portion
60C, 60C': third portion
60a, 60a': temperature measurement hole
A1, A1': first space
A2: second space
S: sample

The invention claimed is:
1. A thermal conductivity measuring device comprising:
a sample container that has a plurality of storage sections;
a drive unit that is configured to move the plurality of storage sections of the sample container; and
a radiation thermometer that is configured to measure a temperature of a surface of the sample container, wherein
a standard sample having known thermal conductivity is installed in at least one of the storage sections, and an object sample which is needed to obtain thermal conductivity is installed in the other storage sections.

2. The thermal conductivity measuring device according to claim 1,
wherein the drive unit is configured to rotate the sample container.

3. The thermal conductivity measuring device according to claim 1,
wherein the drive unit is configured to rotate the sample container, and
the radiation thermometer is fixed and measure each temperature of the surfaces of the storage sections of the sample container which is rotated.

4. The thermal conductivity measuring device according to claim 1,
wherein the sample container has a circle shape or a doughnut shape in a plan view, and is rotatable by the drive unit, and
the sample container has an exposed main surface which is selected from an upper surface, a side surface and a lower surface thereof, and the storage sections, in which a sample to be measured is installed, are provided in the exposed main surface, and
the radiation thermometer is fixed at a position which faces to the exposed main surface.

5. The thermal conductivity measuring device according to claim 1,
wherein the sample container has a doughnut-like disk shape, or cylindrical shape.

6. The thermal conductivity measuring device according to claim 1,
wherein the first part of the heat-insulating material has a temperature measurement hole for the radiation thermometer.

7. A heating device comprising:
a heat source;
a sample container that is provided on an upper surface or a side surface of the heat source and has a plurality of storage sections;
a drive unit that is configured to rotate the heat source and thereby rotate the sample container together with the heat source;
a radiation thermometer that is configured to measure a temperature of a surface of the sample container; and
a heat-insulating material that covers at least a portion of a surface of the heat source,
wherein the heat-insulating material forms at least a space that surrounds the sample container,
wherein a surface of the sample container opposite to the heat source is exposed to the space that is surrounded by the heat-insulating material, and
wherein the heat-insulating material has
a first part which surrounds a lateral side of the heat source,
a second part which surrounds an upper side of the heat source, and
a third part which surrounds a lower side of the heat source,
wherein
the first part and the third part forms a first space in which the heat source is provided, and
the second part forms a second space in which the sample container is provided,
a thickness of the first part is larger than that of the second part, and
the second part has a temperature measurement hole for the radiation thermometer.

8. A thermal conductivity measuring method comprising:
a measurement step of moving a standard sample and an object sample within a sample container that has a plurality of sections to measure temperatures of the standard sample and the object sample at same position; and
a derivation step of obtaining a thermal conductivity, of the object sample in a measurement environment on the basis of the respective temperatures measured in the measurement step.

9. The thermal conductivity measuring method according to claim 8,
wherein in the measurement step, the standard sample and the object sample are rotationally moved and the temperatures of the standard sample and the object sample are measured at the same position.

10. The thermal conductivity measuring method according to claim 8,
wherein in the measurement step, measurement environment is selected, environment is set to the selected measurement environment, and the temperatures of the samples are measured using a fixed radiation thermometer under the selected and set measurement environment.

11. The thermal conductivity measuring method according to claim 8,
wherein the derivation step includes
a step of forming a calibration curve using simulation, wherein known thermal conductivities of the standard sample and a comparative sample are provided on a horizontal axis, and a difference obtained by subtracting a measured temperature of the comparative sample from a calculated temperature of the standard sample is provided on a vertical axis, wherein the calculated temperatures are obtained in simulation, and
a step of determining the thermal conductivity of the object sample by obtaining a difference between the temperature of the standard sample and the temperature of the object sample measured in the measurement step, and applying the difference to the calibration curve.

12. The thermal conductivity measuring method according to claim 8,
wherein the temperatures of at least two standard samples and at least one object sample are measured at the same position in the measurement step and,
in the derivation step, a confirmation is performed whether or not there is a combination of the measured temperatures of the standard samples wherein the measured temperature of the object sample falls between the measured temperatures of the standard samples, and if there is such a combination, it is determined that the object sample has a thermal conductivity which falls between thermal conductivities of the standard samples in the combination.

13. A quality assurance method comprising:
a measurement step of moving a first standard sample having a first thermal conductivity value, a second standard sample having a second thermal conductivity value, and an object ample within a sample container that has a plurality of sections, and measuring temperatures of the first standard sample, the second standard sample, and the object sample at same position; respectively; and
a determination step of determining whether or not a measured third temperature of the object sample falls between a first temperature of the first standard sample and a second temperature of the second standard sample that are measured.

14. The quality assurance method according to claim 13, wherein the temperatures of the standards samples and the object sample are measured in the measurement step with a fixed radiation thermometer.

15. The quality assurance method according to claim 13, wherein a thermal conductivity measuring device is used, wherein the device comprises:
   a sample container that has a plurality of storage sections;
   a drive unit that is configured to move the plurality of storage sections of the sample container; and
   a radiation thermometer that is configured to measure a temperature of a surface of the sample container.

16. The quality assurance method according to claim 15, wherein
   the thermal conductivity measuring device includes a heat source which is located to contact with the sample container, and
   the drive unit is configured to rotate the sample container.

* * * * *